T. BAKER & E. COOKE.
SAFETY CATCH DEVICE TO PREVENT THE ACCIDENTAL STARTING OF FORGING AND OTHER MACHINES.
APPLICATION FILED DEC. 5, 1917.

1,274,498.

Patented Aug. 6, 1918.

Witnesses

Inventors
Thomas Baker
Edwin Cooke
By Sturtevant & Mason
attorneys

UNITED STATES PATENT OFFICE.

THOMAS BAKER AND EDWIN COOKE, OF HORWICH, ENGLAND.

SAFETY CATCH DEVICE TO PREVENT THE ACCIDENTAL STARTING OF FORGING AND OTHER MACHINES.

1,274,498.   Specification of Letters Patent.   Patented Aug. 6, 1918.

Application filed December 5, 1917. Serial No. 205,564.

*To all whom it may concern:*

Be it known that we, THOMAS BAKER and EDWIN COOKE, subjects of the King of Great Britain, both residing at Horwich, in the county of Lancaster and Kingdom of England, have invented certain new and useful Improvements in Safety Catch Devices to Prevent the Accidental Starting of Forging and Other Machines, of which the following is a specification.

In machines that are started and stopped by means of a clutch or other device operated by means of a treadle, it sometimes happens that the treadle is accidently trodden on, and the machine prematurely started, and this has given rise to accidents occurring at various times. For instance in forging machines it is quite common for the man in charge to have to adjust the dies during a spell of work, and if the machine was then started inadvertently as by accidentally depressing the treadle while these operations were being performed, the result is that the man has his hand cut off or is otherwise seriously injured. It is the aim and object of the present invention to provide a device which will avoid such accidents taking place.

Accordingly our invention comprises a locking or safety device which will lock the treadle and prevent it being accidentally depressed.

The invention will be understood from the following description reference being had to the accompanying drawings in which:—

Figure 1:
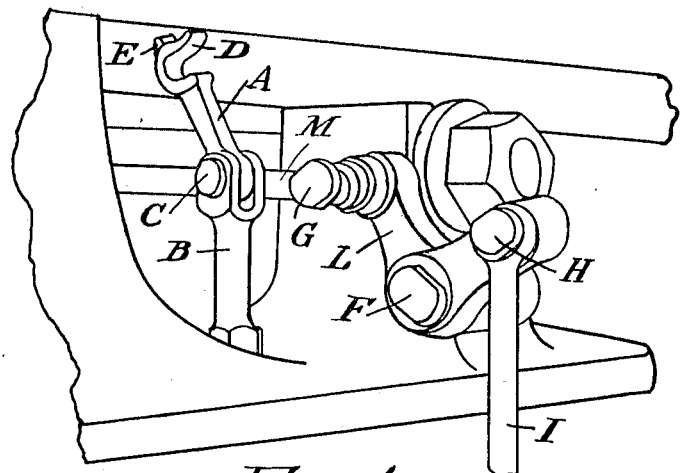
Figure 1 is a perspective view of our safety catch device.

Our safety or locking device comprises an arm A (Fig. 1) pivoted on the pin C of an upright B which is secured to the machine frame. This arm is provided at the end with a hook D so as to engage some part of the mechanism which operates the clutch when the treadle is depressed, in such manner as to act as a catch and prevent the treadle being pressed down. For instance in the case of a forging machine, the treadle operates the clutch through a bell crank lever L journaled on a pin F fixed to the framework of the machine, a rod I coupled to one arm of the bell crank by a pin H, and a rod M coupled to the other arm of the bell crank by a pin G. This pin G is provided with an axial extension having an offset portion or groove between two spaced collars. The catch arm or lever A with the hook at the end (which has a projection E to more easily take hold of it or knock it up), and the upright B which carries the catch lever A is affixed to the machine bed in such a position that this groove lies coincident with the radius of the hook at the end of the catch A when the treadle is in the raised position, i. e., with the clutch out of gear. Consequently the man in charge can throw this catch D into engagement with the groove and thus absolutely lock the treadle in the raised position, so that no amount of pressure brought upon the treadle, can depress it or cause the clutch to be thrown into gear to start the machine. To start the machine the catch has to be actually lifted clear of the pin G, whereupon the treadle can be freely depressed.

Figure 2:
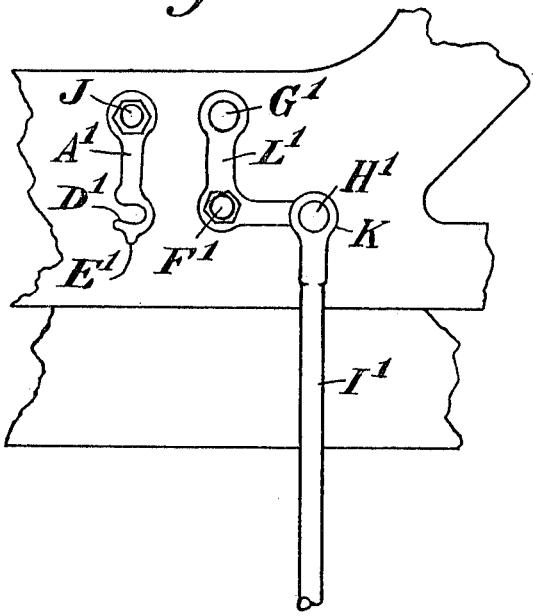
Fig. 2 is a side view showing a slight modification in the mounting of the catch.

In the arrangement above described the catch lever is pivoted to the post B between two jaws so as to swing in the plane of the post. In some cases however as when the post is affixed to the side of the bed, the catch lever may be so pivoted to the post as to swing in a plane at right angles thereto, so that it will engage the pin. This is shown in Fig. 2 in which $A^1$ is the catch arm pivoted on the end J of a post affixed to the side of the bed, and swing in a plane at right angles to the post so that it will engage the angles to the post so that it will engage the pin $G^1$. $I^1$ is the rod coupled to the treadle at the bottom and to the pin $H^1$ above by means of the jaw or shackle K. This pin $H^1$ is carried on the bell crank lever $L^1$ which oscillates on a pin $F^1$ fixed to the framework of the machine. In other cases the catch lever may have an eye at the end so as to engage the pin endwise instead of sidewise.

The attendant wishing to adjust his tools or clamps allows the treadle to rise thus operating the clutch and stopping the machine. He then throws the catch arm A or $A^1$ over onto the pin G or $G^1$, thus locking the treadle in the raised position. When he has finished the adjustment he puts his hand under the knob E or $E^1$ and throws the catch lever back, so that the treadle is unlocked and can be operated. The bell crank operates the clutch through the connecting rod M or in other suitable manner.

In existing machines that are driven direct from a motor or driving shaft, the man in charge when he desires to pack or adjust the dies has to risk someone depressing the starting treadle, or else has to bring the entire machine to a standstill. The latter alternative means loss of time while waiting for the fly wheel to come to rest and loss of time in getting the machine into action again, as well as stopping other machines which may be in the same line of shafting. The present invention avoids these disadvantages, and enables the machine to be driven with safety from a main line of shafting instead of from a countershaft or independent motor, because the machine is prevented from being accidentally started, thus enabling the tools to be changed or adjusted without in any way interfering with other machines or without stopping its own driving wheels.

The mode of action of this is as follows:—
The attendant wishing to adjust his dies or clamps throws the hook D over on to the pin G. It now absolutely locks the treadle. When he has done his work he puts his hand under the knob E and throws the hook back when the treadle is released so that it can be operated.

Referring now to Fig. 2, A′ is an arm pivoted on pin J fixed to the framework and carrying a hook D′ with preferably a projection E′ as in the previous case. I′ is a spindle linked or pivoted to the treadle at the bottom and to a pin H′ above by means of a shackle K. This pin H′ is carried on a bell-crank-lever L′ itself oscillating on a pin F′ fixed to the framework of the machine. The other arm of the bell-crank has a pin G′ into which the hook D′ when thrown back holds. The operation of this device is precisely the same as in the other. The attendant when he wishes to lock the machine throws forward the arm A′ until its hook hooks firmly on the pin G′. The treadle operates the clutch device in the usual manner in Fig. 1 directly through pin G and connecting rod I and in Fig. 2 directly through any convenient gearing connecting the clutch with the treadle. The treadle of this connecting gearing is very well known, and therefore has no need to be described particularly.

In thus describing our invention, we wish to point out that an eye or pin at the end of the arm A or A′ catching on a pin or eye on a rotating part of the mechanism could be used instead of the simpler device of a hook, and in speaking of a hook we therefore wish to include throughout this more clumsy device of an eye or the like catching a pin, hook or device revolving on a part of the rotating mechanism. We do not however recommend this as it is a mere mechanical equivalent of our device, but is much more difficult to apply.

We declare that what we claim is:—

1. In a device of the class described, a supporting structure, a bell crank pivoted thereon, a starting element secured to one arm of said bell crank, and a catch pivoted to said supporting structure for holding said bell crank in a predetermined position.

2. In a device of the class described, a supporting structure, a bell crank pivoted thereon, a starting element coupled by a pin to one arm of said bell crank, a clutch element coupled by a pin to the other arm of the said bell crank, an axial extension on the said pin, and a catch pivoted to the said supported structure for engaging the said axial extension in a predetermined position.

In witness whereof, we have hereunto signed our names this 1st day of Nov., 1917, in the presence of two subscribing witnesses.

THOMAS BAKER.
EDWIN COOKE.

Witnesses:
W. P. THOMPSON,
JOHN McLACHLAN.

Copies of this patent may be obtained for five cents each, by addressing the "Commissioner of Patents, Washington, D. C."